(12) United States Patent
Kobayashi et al.

(10) Patent No.: US 7,606,946 B2
(45) Date of Patent: Oct. 20, 2009

(54) REMOVABLE DEVICE AND PROGRAM STARTUP METHOD

(75) Inventors: Shinya Kobayashi, Tokyo (JP); Shinji Uematsu, Tokyo (JP)

(73) Assignee: Saslite, Corp., Tokyo (JP)

( * ) Notice: Subject to any disclaimer, the term of this patent is extended or adjusted under 35 U.S.C. 154(b) by 584 days.

(21) Appl. No.: 10/532,689

(22) PCT Filed: Oct. 27, 2003

(86) PCT No.: PCT/JP03/13733

§ 371 (c)(1),
(2), (4) Date: Oct. 11, 2005

(87) PCT Pub. No.: WO2004/038584

PCT Pub. Date: May 6, 2004

(65) Prior Publication Data

US 2006/0190941 A1    Aug. 24, 2006

(30) Foreign Application Priority Data

Oct. 28, 2002    (JP)    ............... 2002-313425

(51) Int. Cl.
*G06F 3/00* (2006.01)
(52) U.S. Cl. ............................. 710/10; 710/8
(58) Field of Classification Search ............ 710/8, 710/10
See application file for complete search history.

(56) References Cited

U.S. PATENT DOCUMENTS

| | | | | |
|---|---|---|---|---|
| 6,088,802 A * | 7/2000 | Bialick et al. | ................... | 726/3 |
| 6,353,885 B1 * | 3/2002 | Herzi et al. | ..................... | 713/1 |
| 6,654,797 B1 * | 11/2003 | Kamper | ..................... | 709/220 |
| 2002/0003576 A1 * | 1/2002 | Konishi et al. | .............. | 348/232 |
| 2003/0174167 A1 * | 9/2003 | Poo et al. | ..................... | 345/752 |
| 2003/0226006 A1 * | 12/2003 | Ballard | ......................... | 713/1 |

(Continued)

FOREIGN PATENT DOCUMENTS

JP    1-230120    9/1989

(Continued)

OTHER PUBLICATIONS

"DOS/V Power Report," vol. 10, No. 10, p. 210 (More particularly, p. 210 left col., lines 11-21, reciting "AUTORUN.INF"), Impress Corp. Oct. 1, 2000.

(Continued)

*Primary Examiner*—Alford W Kindred
*Assistant Examiner*—David E Martinez
(74) *Attorney, Agent, or Firm*—Drinker Biddle & Reath LLP

(57) ABSTRACT

The present invention provides a highly convenient removable device and a program startup method. A hub division unit 31 in a single composite device 2 allocates data exchange with the computer 1 side to a plurality of devices, thereby easily realizing a plurality of functions. When connected to a USB, a recognition control unit 32 returns a signal representing a CD-ROM in a simulated manner in response to inquiry about the type of the device from the host side. When a device is mounted, a desired processing such as a program execution described in the script is automatically performed without installing a resident program for detecting a device mounting in advance in the computer side.

9 Claims, 1 Drawing Sheet

U.S. PATENT DOCUMENTS

2003/0233533 A1* 12/2003 Avraham ..................... 713/1

FOREIGN PATENT DOCUMENTS

| JP | 01-230120 | 9/1989 |
| --- | --- | --- |
| JP | 05-002456 | 1/1993 |
| JP | 5-100862 | 4/1993 |
| JP | 05-100862 | 4/1993 |
| JP | 07-078102 | 3/1995 |
| JP | 7-234759 | 9/1995 |
| JP | 08-286925 | 11/1996 |
| JP | 8-286925 | 11/1996 |
| JP | 10-260927 | 9/1998 |
| JP | 11-120055 | 4/1999 |
| JP | 2000-196648 | 7/2000 |
| JP | 2000-267818 | 9/2000 |
| JP | 2000-347839 | 12/2000 |
| JP | 2000/347839 | 12/2000 |
| JP | 2001-256168 | 9/2001 |
| JP | 2002-041247 | 2/2002 |
| JP | 2002-108484 | 4/2002 |
| JP | 2002/149408 | 5/2002 |
| JP | 2002-149408 | 5/2002 |
| JP | 2003-114859 | 4/2003 |
| JP | 2003-178017 | 6/2003 |
| JP | 2004-054896 | 2/2004 |
| JP | 2004-151785 | 5/2004 |
| JP | 2005-506633 | 3/2005 |
| WO | 2004/040428 | 5/2004 |

OTHER PUBLICATIONS

"MSJ," vol. 58, p. 148-151 (More particularly, p. 148-149, reciting "AUTORUN.INF"), Ascii Corp., Dec. 18, 1998.

Tsuchiya et al., "VMware 3.0 throughout utilizing Manual," ISBN: 4-7561-4067-X, pp. 68, 69, 116, 117 (More particularly, p. 68, lines 3-4, p. 69, lines 4-6, p. 116, lines 7-10), first edition, Ascii Corp., Apr. 21, 2002.

"Free BSD Press," No. 2, p. 187-194 (More particularly, p. 189, right col., line 7 from the bottom p. 190, left col., line 3, p. 193, right col. lines 6-10), Mainichi Communications Inc., Dec. 18, 2000).

* cited by examiner

REMOVABLE DEVICE AND PROGRAM STARTUP METHOD

This is a PCT National Phase application of PCT/JP2003/013733, filed on Oct. 27, 2003

BACKGROUND OF THE INVENTION

1. Field of the Invention

The present invention relates to a highly convenient removable device and a program startup method.

2. Description of the Background Art

Along with the continued growth in the use of various types of computers, which accompanies the increasing use and progress in semiconductor technology and the Internet, recent years have seen diversification in the methods used for connecting peripheral devices. As a result, a need has been created for a universal peripheral device interface that can be used for any computer models and the USB (Universal Serial Bus) interface has been proposed as a specific example of such a standard. Moreover, reductions in the weight and size of various computers and the expansion of their portable (mobile) uses have created a need for removable external storage devices, fueling the growing popularity of USB memory, which is a memory device that can be easily connected to a PC via the above-mentioned USB interface.

USB memory has various storage capacities, including 32 MB, 64 MB, etc. More specifically, it is a peripheral device of the size of a person's thumb that is furnished with a flash memory element inside and, when connected to a USB port (connection port) of a PC etc. via a USB connector provided at one of its ends, is recognized as a removable (attachable/detachable) disk drive, etc., and permits access, such as reading/writing, and the like.

Nowadays the use of the Internet is becoming particularly widespread and using a rented/borrowed computer other than the one normally used while away from home is becoming a more frequent practice, so that, for instance, in many cases one sends and receives e-mail using a PC rented by the hour at an Internet cafe, etc. or borrowed from other people, such as colleagues at the office, customers, family members, friends and acquaintances, etc.

Normally, PCs at such temporary locations do not have data such as one's sent and received e-mail or account information and the type and version of their e-mail programs (software used for electronic mail) are not the same as those of one's favorite e-mail program. Furthermore, while it is possible to consider setting up one's account information on another person's PC in order to send and receive e-mail, in such a case, privacy problems may arise as a result of forgetting to erase the data concerning such account information and sent/received e-mail. Thus, some people resort to recording data etc. concerning such account information, e-mail software, and sent/received e-mail in a USB memory and carrying it along with them.

In other words, not only data, but software, such as e-mail programs, etc., and shortcuts to software, can be stored in a USB memory as well, and, in addition to saving and reading data, the USB memory can be used to perform the startup of such software.

However, the problem is that when one tries to utilize the target data and software stored in a USB memory, reaching them involves burdensome operations, with their complexity increasing with the frequency of use of the USB memory.

For instance, using data stored in a USB memory required a corresponding complex procedure, in the course of which the user not only inserted the USB memory in the PC, but also performed operations on the OS (Operating System) screen by going through sequential options, such as "My Computer"→"Removable Disk"→"Target Operation", or specified a file name for execution via the keyboard.

The present invention is proposed to solve the problems of the above-described conventional technology, and its object is to provide a highly convenient removable device and a program startup method.

SUMMARY OF THE INVENTION

In order to attain the above-mentioned object, according to one aspect of the present invention, there is provided a removable device which is mounted to a universal peripheral device interface of a computer executing an automatic startup script stored in a device of a specified type when the device is connected thereto, comprising: a ROM or a read-writable storage device as its main storage device and a simulation unit configured to return a signal indicating that the device is of a specified type in which an automatic startup script is stored in the storage device and executed by a computer to which the device is attached in response to an inquiry signal concerning the type of the device sent from the computer when being connected to the above-mentioned universal peripheral device interface.

In this embodiment, even if the device is of a different kind, such as a USB memory, etc., an inquiry from the host side causes it to respond in a simulated manner that it is the target equipment for the execution of the automatic startup script, such as a CD-ROM drive, etc. For this reason, even if a resident program used for detection of mounting is not installed on the computer in advance, the desired processing, such as execution of the program contained in the script, etc., automatically takes place when the device is mounted. As a result, various functions and uses of the device can be realized even without manually installing dedicated software etc. used for the device. Moreover, automatic startup from the removable device is also easily achieved on computers, where software cannot be installed because the user does not have administrator rights.

According to another aspect of the present invention, the simulation unit may return an absence signal representing absence of media at least once and then returns a presence signal representing presence of the media in response to inquiry signals as to a presence of media repeated via the universal peripheral device interface.

In this embodiment, even in cases where media insertion is a pre-condition for script execution, the script is executed smoothly and reliably by returning a signal of the same pattern as insertion in a simulated manner in response to inquiries as to the presence of media, although, unlike with actual devices, no media insertion is performed when responding that the device is the specified target device (for instance, a CD-ROM) for script execution by the computer.

According to another aspect of the present invention. The removable device may further comprise a plurality of unit devices allocated in single removable device; and hub unit configured to allocate data exchange with the computer side to each of the unit devices.

In this embodiment, there is no need to consider the specific file system of an actual CD-ROM even when one intends to save data to a device including a unit device recognized as a CD-ROM in a simulated manner, and data can be easily saved to a type of unit device that does not require conversion of data, such as a removable disk or an HDD.

According to another aspect of the present invention, the removable device may store an auto-starting program launched by the automatic startup script in the storage device in advance, and the auto-starting program, along with performing password-based authentication, is configured to perform, or let the removable device perform, at least either formatting of specified data or termination of the program when an incorrect password is entered a specified number of times.

In this embodiment, even in case of loss, misplacement, theft, etc., of the removable device, data is protected from unauthorized access by formatting etc. the data when a password error is repeated a specified number of times.

According to another aspect of the present invention, the removable device may store the auto-starting program launched by the automatic startup script in the storage device in advance and the auto-starting program establishes associations between the desired file extensions and the desired programs on a temporary basis only while the removable device is in use.

In this embodiment, the association of the file extensions and programs is performed by the auto-starting program on a temporary basis only while the device is in use. For this reason, while files are easily and reliably opened by the corresponding application programs in the removable device while it is use, when the auto-starting program terminates, the simulated associations stop working, so that after use no associations remain to give trouble to the owner if the computer is borrowed from other people.

According to another aspect of the present invention, the removable device may store the auto-starting program launched by the automatic startup script in the storage device in advance and the auto-starting program is configured to handle files that have been deleted in a storage area recognized as a removable disk by the computer as candidate files marked for deletion in a trash bin specific to the removable disk and, with respect to the candidate files marked for deletion, to accept and execute an operation of displaying the files contained therein, an operation of restoring a desired file, and an operation of completely erasing some or all of the files.

According to another aspect of the present invention, the removable device may store the auto-starting program launched by the automatic startup script in the storage device in advance and the execution of the auto-starting program is preconditioned by password-based authentication. Therefore, security is even more improved.

According to another aspect of the present invention, the removable device may store the auto-starting program launched by the automatic startup script in the storage device in advance and the auto-starting program is an electronic mail program which, along with operating based on account information contained in the removable device, stores sent and received electronic mail data to the removable device, thereby making it possible to carry along all the information related to sending and receiving electronic mail as well as easily send and receive electronic mail at any time and from any place.

Further according to another aspect of the present invention, there is provided a method for starting-up a program comprising: executing a detection program on the computer in advance; and when a removable device is mounted to the universal peripheral device interface of the computer, launching the detection program a program corresponding to the specified data in the removable device.

In this embodiment, control operations that are more appropriate for the device in comparison with using only the OS and standard drivers are executed on the PC because installing a resident detection program for detecting the mounting of a device such as USB memory on the computer in advance allows for password authentication based on execution of a dedicated program, application startup, and other desired processing to be carried out automatically even when the computer side does not have or suspends script execution and other functions at the time of mounting.

Further according to another aspect of the present invention, there is provided a removable device attached/detached to/from a universal peripheral device interface of a computer and including a ROM or read-writable storage device as its main storage device, wherein the device is configured to boot the computer by providing information used for starting an operating system along with sending a reply representing a flexible disk drive in response to access from the BIOS of the computer via the universal peripheral device interface.

In this embodiment, even if the PC has a different original OS preinstalled, it can be easily used by mounting the removable device and starting one's own desired environment from the OS level.

Further according to another aspect of the present invention, there is provided a removable device which is attached/detached to/from a universal peripheral device interface of a computer executing an automatic startup script stored in a device of a specified type when the device is connected thereto, comprising: a ROM or a read-writable storage device as a main storage device; and means for returning a signal indicating that the device is of a specified type in which an automatic startup script is stored in the storage device and executed by a computer to which the device is attached, in response to an inquiry signal concerning the type of the device sent from the computer upon connection to the universal peripheral device interface.

Further according to another aspect of the present invention, there is provided a removable device attached/detached to/from a universal peripheral device interface of a computer, comprising: a ROM or read-writable storage device as its main storage device; and means for sending a reply representing a flexible disk drive in response to access from a BIOS of the computer via the universal peripheral device interface and booting the computer by providing information stored in the storage device and used for starting an operating system of the computer.

DETAILED DESCRIPTION OF THE PREFERRED EMBODIMENTS

Figure 1:
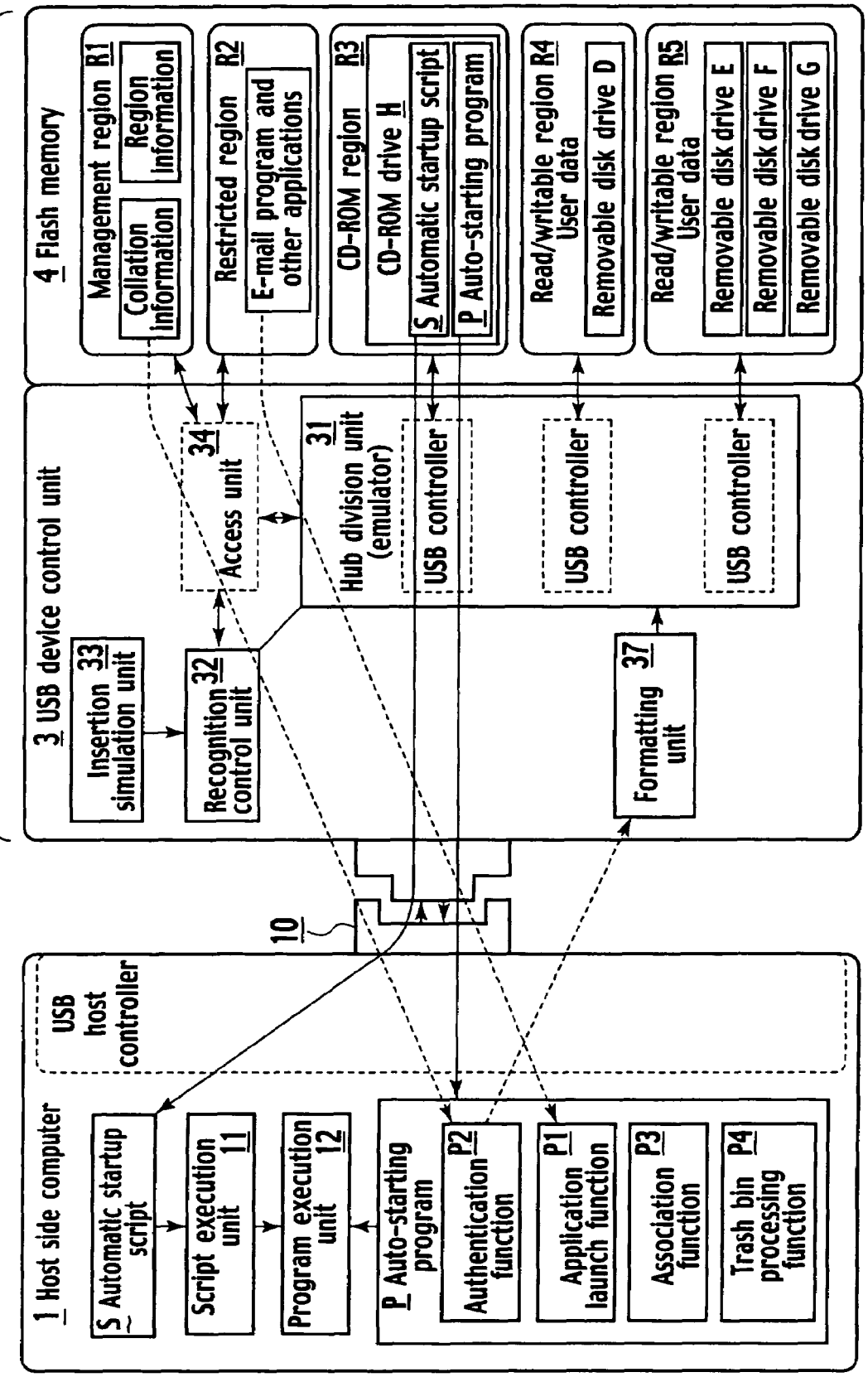
FIG. 1 is a functional block diagram illustrating the configuration of an embodiment of the present invention.
1 Computer
2 Device
3 USB device control unit
4 Flash memory
11 Script execution unit
12 Program execution unit
31 Hub division unit
32 Recognition control unit
33 Insertion simulation unit
37 Formatting unit
S Automatic startup script
P Auto-starting program
R1~R5 Regions

Next, a number of modes for practicing the invention (respectively called "embodiments" below) are described specifically by referring to drawings. In addition, although each embodiment can be realized with the aid of programs and wired logic on dedicated LSI chips, in such a case, the hardware and programs may have various modifications, which is why a virtual circuit block is used below to realize the functions of the embodiments and the present invention.

1. Schematic Configuration of First Embodiment

First of all, FIG. 1 is a functional block diagram showing a schematic configuration of first embodiment. Namely, first embodiment is a removable composite device (hereinafter called "composite device") 2, which is used by attaching/detaching it to/from a computer 1, and the computer 1 includes a USB as a universal peripheral device interface. Specifically, the computer 1 includes a USB port 10, a USB host controller, and a device driver necessary for the USB. Below, the computer 1 is called the "host side" or "computer side" in connection with the USB.

Moreover, the composite device 2 is attached/detached to/from a USB port 10 of the computer, and although in this example it includes a read/writable flash memory 4 as its main storage device, a small hard disk drive or a ROM can be also used as the main storage device. Furthermore, the composite device 2 includes a USB device control unit 3.

In the USB device control unit 3, various components operating in the following manner, as shown in FIG. 1, are realized with the help of wired logic on an ASIC chip or another custom chip or based on a combination of a CPU, built-in programs, or micro-programs, etc., and, in addition, in the computer 1, various components operating in the following manner, as shown in FIG. 1, are realized based on the operation of an OS or other programs.

2. Operation and Effects of First Embodiment

Specifically, first embodiment has the following operation and effects.

2-1. Hub Division

A hub division unit 31 of the USB device control unit 3 is hub means for realizing a plurality of functions by performing an operation (hereinafter called "hub division") that allocates data exchange with the computer 1 side to a plurality of devices (respectively called "unit devices") in a single composite device 2. Specific embodiments of hub division are:

(1) A universal USB hub is miniaturized and incorporated into the device.
(2) A plurality of device components are managed using the USB controller of a single device.
(3) The USB controllers of unit devices and the hub are emulated with LSI using ASIC and other custom chips, general-purpose CPUs and built-in programs, etc., and it is possible to consider various appropriate combinations thereof. However, the device emulated here is a USB controller.

Based on this type of hub division, a CD ROM region R3 and read-writable regions R4 and R5 are set up in a storage area of a flash memory 4. A CD-ROM drive (drive letter "H"), which is set up in a CD-ROM region R3, as well as a removable disk drive (drive letter "D"), which is set up in a read-writable region R4, are regarded as unit devices, or alternatively, the regions can be viewed as unit devices themselves.

Moreover, three removable disk drives (drive letters "E", "F", and "G") are set up in a read-writable region R5 by hub division unit 31, with the three removable disk drives "E", "F", and "G" also constituting a single unit device. In addition, each individual removable disk drive "E", "F", and "G" can be regarded as a unit device.

Furthermore, a management region R1 and a restricted region R2, which are directly manageable and read/writable only from access portion 34 of the USB device control unit 3, unlike the above-described USB-based unit devices, which are accessible from the host side, are set up in the storage area of the flash memory 4.

Here, in regions R1 and R2, access from the OS for writing/deletion and regular recognition, etc. is prohibited. For example, information necessary for region management, etc is placed in management region R1. Moreover, in restricted region R2, access for writing, deletion, etc. through USB device control unit 3 is permitted only to auto-starting program P described below, and e-mail programs and other application software, etc. are kept in this region. As a result, the software is protected from accidental deletion and illegal copying.

In addition, to handle information that has to be protected in the devices, a region, where reading of USB-connected unit devices by the host side is possible but writing is prohibited, can be set up instead of the restricted region R2, and the information can be placed in such a region.

The read-writable (i.e., readable and writable) region R4 permits free access as a regular removable disk, with presentation materials, word processor documents, address records, and electronic mail data used by the e-mail program placed in this region.

In addition, passwords can be set up for access to each of the regions, with collation information used for password authentication placed in a region inaccessible to the OS side, in the same manner as the regions R1 and R2.

If a plurality of regions handled in mutually different ways are set up as unit devices by the hub division unit 31 in the above-described manner, then whenever data have to be saved via simulated recognition to a removable device, including unit devices handled as a CD-ROM drive, there is no need to consider the specific file system of an actual CD-ROM and data can be easily saved in a type of unit device that does not require data conversion, such as a removable disk drive or an HDD, etc.

2-2. Simulated Recognition

Incidentally, some OS (for example, the Microsoft® Windows® series) execute a predetermined script file (for example, "Autorun.inf") on a medium whenever the medium is inserted into a device of the specified type (for example, a CD-ROM drive). The computer 1 is assumed to be a computer provided with such an OS.

Moreover, whenever there is a device that may be mounted to the USB, the host repeatedly sends periodic inquiry signals regarding the type of the device via the USB line, and, in response to the inquiry signals, the device newly mounted to the USB sends the host a reply regarding the device type to which it belongs, causing the host to recognize the connection of the device to the host. Thus, when a device of the specified type is connected to the computer 1, a script execution unit 11 executes the automatic startup script stored in the device.

Thus, when connected to the USB, recognition control unit 32 of the USB device control unit 3 responds to the host's inquiry signals regarding the type of the device in a simulated manner by sending a signal representing a CD-ROM drive. Among the multiple unit devices, the simulated response is given only regarding the CD-ROM region R3. Moreover, auto-starting program P launched by the above-mentioned automatic startup script S is stored on the CD-ROM drive H in the CD-ROM region R3.

Specifically, the removable device 2, i.e. the USB memory, is not the target device for script execution, but in response to an inquiry from the host, the recognition control unit 32 sends a signal representing it as a target device for automatic startup script execution, such as a CD-ROM drive, etc.

For this reason, even if a resident program used for detection of mounting is not installed in advance on the computer, the desired processing, such as execution of the program contained in the script, etc., automatically takes place when the device is mounted. As a result, various functions and uses of the device can be realized even without manually installing dedicated software etc. used for the device. Moreover, automatic startup of the desired programs from the removable device is also easily achieved on computers, where software cannot be installed because the user does not have administrator rights.

2-3. Media Insertion

Moreover, in the above-described OS, inquiries as to the presence of mounted media are repeatedly sent to the device, causing it to respond, and when the "absent" state becomes a "present" state at a certain point, the change is recognized as media insertion.

Then, as explained above, even in cases where media insertion is a pre-condition for script execution, the script is executed smoothly and reliably by an insertion simulation unit 33 returning a signal of the same pattern as insertion in a simulated manner in response to inquiries as to the presence of media, although, unlike with actual devices, no media insertion is performed when the recognition control unit 32 is caused to respond to the effect that the device is the specified target device (for instance, a CD-ROM drive) for script execution by the computer.

Namely, in response to the USB host controller's inquiry signals as to the presence of media repeated via the USB, the insertion simulation unit 33 returns a signal representing absence of media at least once, and then, e.g. in response to a second inquiry, returns a signal representing presence of media.

As a result, the OS of the computer 1 recognizes that media have been inserted and script execution unit 11 of the computer 1 executes the automatic startup script S stored in the device. Although here the equipment of the "specified type", which is the target of script execution, is assumed to be a "CD-ROM drive", it can be changed and its scope can expanded to include other types of devices. In addition, the program execution unit 12 is means for executing executable files with the ".exe" extension and, as long as there is a record of the directory, names, parameters, etc. of the executable files in the above-mentioned script, executes the executable files in accordance with that information.

In the first embodiment, the execution of startup program P is specified in the automatic startup script S. Of course, in addition to that, an application launch function P1 of auto-starting program P can be used to invoke, in a derivative manner, other programs such e-mail programs and other applications. Hereinbelow, the derivatively invoked programs are also called auto-starting programs P.

2-4. Data Deletion Due To Password Errors

Moreover, in the first embodiment, when a disk is lost, in order to prevent it from being viewed or used for malicious purposes, entering an incorrect password a specified number of times causes data to be formatted or causes the program used to authenticate the password to terminate so as to make password cracking more difficult.

Namely, along with authenticating passwords, authentication function P2 of the auto-starting program P formats data in the entire specified region of the removable device 2 by sending an instruction to a formatting unit 37 of the USB device control unit 3 when an incorrect password is entered a specified number of times. In addition, the processing used when a password is entered incorrectly a specified number of times may consist simply in the termination and deletion of the auto-starting program P.

In this manner, even in case of loss, misplacement, theft etc. of the composite device 2, data is protected from unauthorized access by formatting etc. the data when a password error is repeated a predetermined number of times.

In addition, password cracking can be made more difficult if the number of errors allowed before terminating the program is set at random. Moreover, if password authentication requires a certain time, such as 0.1 to 0.5 seconds, the user does not experience any inconvenience in normal use, but password cracking based on a brute-force dictionary attack is made more difficult as well.

In addition, the auto-starting program P can be imparted with a function for overwriting information in the management region R1, modifying the size and attributes of the regions, such as write protection, and creating new regions. In addition, when regions are modified, there may be situations where it becomes necessary to move data, and, for instance, when the respective size of two regions is modified by moving the boundary between them, the auto-starting program P backs up data contained in the regions prior to the modification and temporarily moves it to an empty region of the HDD or memory of the computer 1 or the composite device 2, overwrites the region information of the region R1, and returns the backed-up data to the regions after the modification.

2-5. File Extension-Related Associations

Moreover, when software is loaded on the device, absence of extension-based associations with data does not allow the data to be readily used, and, in the first embodiment, the auto-starting program P is configured in a temporary and simulated manner such that, only while the removable device is in use, the program establishes associations between the desired file extensions and the application programs that need to be executed to open the files with these extensions when the operation of opening the files is carried out.

For instance, when a file with a ".doc" extension is double-clicked during program operation, the association function P3 of the auto-starting program P causes this event to be detected by the operation of the OS or the auto-starting program P, thereby starting the specified software loaded on the device, such as "such and such Word", etc. and automatically opening data in the file.

The association of file extensions with programs by the auto-starting program P is carried out on a temporary basis only while the device is in use. For this reason, while files are easily and reliably opened by the corresponding application programs in the composite device 2 while it is use, when the auto-starting program terminates, the simulated associations stop working, so that after use no associations remain to give trouble to the owner if the computer is borrowed from other people.

2-6. Trash Bin on Removable Disk

Although with some operating systems the deletion of files does not result in their immediate erasure and instead the files are automatically saved in a special area called "Trash Bin", on a removable disk, files are erased completely. In particular, removable disks are often taken along on a trip, etc., and any accidental deletion may result in serious trouble. This is why the trash bin processing function is added to the removable disk.

Namely, as a result of the operation of the trash bin processing function P4 of the auto-starting program P, in any unit device recognized as a removable disk, moving data itself or its management information to a specified region or changing its flags and other attribute settings results in handling the files with respect to which the user has performed a deletion operation as candidate files marked for deletion in the removable disk-specific trash bin.

Furthermore, with respect to the candidate files marked for deletion, the auto-starting program P is provided with a function for accepting and executing various operations such as displaying the files contained inside, restoring the desired files ("Restore Data To Original Location"), and completely erasing some or all of the files (for instance, "Empty The Trash Bin").

By doing so, convenience is enhanced by utilizing a unique so-called "Trash Bin" for file deletion on the removable disk.

3. Second Embodiment

Second embodiment relates to a program startup method, where the essential functions of the first embodiment are not prerequisite, and a detection program is executed on a computer in advance and the detection program starts programs corresponding to specified data contained in the device when the device is mounted to the universal peripheral device interface of the computer.

Here, the expression "programs corresponding to specified data" may refer to programs, whose program file names and directory positions are indicated by the data, or to identifying individual devices based on IDs recorded in the devices, such as a USB memory, etc., and starting programs that correspond to the results. Moreover, the term "programs" used here may refer to a script, such as "Autorun.inf" used in the Windows®-series operating systems.

In the second embodiment, a resident application program (hereinafter called a "resident program"), which automatically expands and displays the contents of a removable disk drive in a program such as Explorer, starts programs, etc., is created in accordance with instructions from users, manufacturers, or sellers, and the installer of the above-mentioned resident program is run by the user only when it is first introduced.

In order to distribute the installer, it is, for instance, preloaded into a USB memory in advance and only when the user uses the USB memory for the first time in their PC, the above-mentioned installer loaded into the USB memory is executed, performing the operation of installation of the above-mentioned resident program.

As a result, when this USB memory or another specified USB memory is inserted the next time or later, the following automatic startup becomes effective. Namely, when a USB memory is inserted into the USB port of a PC, the OS recognizes the USB memory→the above-mentioned resident program recognizes the USB memory→and the above-mentioned resident program performs the desired processing, such as execution of a specific application program stored in the USB memory. Therefore, the conventional complex operations, which the user has had to go through, for instance, such as "My Computer"→"Removable Disk"→"Target Operation", become unnecessary.

In this manner, control operations that are more appropriate for the device in comparison with using only the OS and standard drivers are executed on the PC because installing a resident detection program for detecting mounting of USB memory and other devices on the computer in advance allows for password authentication based on execution of a dedicated program, application startup, and other desired processing to be carried out automatically even when the computer does not have or suspends script execution and other functions at the time of mounting.

4. Third Embodiment

Recognition of a USB memory as a flexible (floppy®) disk drive on a simulated basis permits booting from the USB memory by inserting the device into a PC capable of booting from the drive and turning the power on.

Namely, the third embodiment is a removable device mounted to a universal peripheral device interface of a computer and provided with a ROM or read-writable storage device as its main storage device, wherein the device is configured to boot the above-mentioned computer by providing information used for starting an operating system along with sending a reply representing a flexible disk drive in response to access from the BIOS (basic input-output system usually stored in a ROM) of the above-mentioned computer via the above-mentioned universal peripheral device interface.

In Embodiment 3, even if the PC has a different original OS preinstalled, it can be readily used by mounting the removable device and starting one's own desired environment from the OS level. In particular, loading Windows or another OS into the USB memory makes it possible to use one's own PC environment "as is" on another person's PC.

INDUSTRIAL APPLICABILITY

As mentioned above, the present invention can provide a highly convenient removable device and a program startup method.

The invention claimed is:

1. A removable device attached/detached to/from a universal peripheral device interface of a computer, comprising:
   a ROM or a read-writable memory as a main memory; and
   an automatic startup script stored in an area recognizable as a specified type of device within the ROM or the read-writable memory; and
   a pseudo recognition unit configured to return a signal indicating that the removable device is the specified type of device in response to an inquiry signal inquiring the type of the device sent from the computer upon connection to the universal peripheral device interface of the computer,
   wherein the pseudo recognition unit returns an absence signal representing as absence of media at least once, and then returns a presence signal representing a presence of the media in response to an inquiry signal inquiring a presence of media repeated via the universal peripheral device interface to allow the automatic startup script to be automatically executed by the computer.

2. The removable device according to claim 1, further comprising:
   a plurality of unit devices, each being recognizable as a portion of the removable device by the computer; and a hub unit configured to allocate data exchange between the computer and each of the unit devices.

3. The removable device according to claim 1, wherein an auto-starting program launched by the automatic startup script is stored in the area recognizable as a specified type of device within the ROM or the read-writable memory in advance, and the auto-starting program, along with performing password-based authentication, performs, or lets the removable device perform, at least either formatting of specified data or termination of the program when an incorrect password is entered a predetermined number of times.

4. The removable device according to claim 1, wherein an auto-starting program launched by the automatic startup script is stored in the area recognizable as a specified type of device within the ROM or the read-writable memory in advance, and the auto-starting program establishes associations between desired file extensions and desired programs on a temporary basis only while the removable device is in use.

5. The removable device according to claim 1, wherein an auto-starting program launched by the automatic startup script is stored in the area recognizable as a specified type of device within the ROM or the read-writable memory in advance, and the auto-starting program is configured:
to handle files that have been deleted in an recognizable as a removable disk within the ROM or the read-writable memory by the computer as candidate files marked for deletion in a trash bin specific to the removable disk, and with respect to the candidate files marked for deletion, to accept and execute an operation of displaying the files contained in the area recognizable as the removable disk, an operation of restoring a desired file, and an operation of completely erasing some or all of the files.

6. The removable device according to claim 1, wherein an auto-starting program launched by the automatic startup script is stored in the area recognizable as a specified type of device within the ROM or the read-writable memory in advance, and the execution of the auto-starting program is preconditioned by password-based authentication.

7. The removable device according to claim 1, wherein an auto-starting program launched by the automatic startup script is stored in the area recognizable as a specified type of device within the ROM or the read-writable memory in advance, and the auto-starting program is an electronic mail program which, along with operating based on account information contained in the removable device, stores sent and received electronic mail data in the removable device.

8. A method for launching a program, comprising:
executing an installer program for installing a detection program, which is stored in a removable device attached/detached to/from a universal peripheral device interface of a computer, such that the detection program is installed in the computer;

storing an automatic startup script in an area recognizable as a specified type of device within a ROM or a read-writable memory of the removable device;

sending an inquiry signal inquiring the type of a device sent from the computer upon connection between the removable device and the universal peripheral device interface of the computer, and receiving a signal indicating that the removable device is the specified type of device, an absence signal representing an absence of media at least once, and a subsequent presence signal representing a presence of the media in response to the inquiry signal to allow the automatic startup script to be automatically executed by the computer;

executing the detection program in the computer in advance; and launching, when the removable device is attached to the universal peripheral device interface of the computer, a program corresponding to specified data in the removable device by the detection program.

9. A removable device which is attached/detached to/from a universal peripheral device interface of a computer, comprising:

memory means as a main memory;

means for storing an automatic startup script in an area recognizable as a specified type of device within the memory means;and means for returning a signal indicating that the removable device is the specified type of device in response to a inquiry signal inquiring the type of the device sent from the computer upon connection to the universal peripheral device interface of the computer, wherein the means for returning returns an absence signal representing an absence of media at least once, and then returns a presence signal representing a presence of the media in response to an inquiry signal inquiring a presence of media repeated via the universal peripheral device interface to allow the automatic startup script to be automatically executed by the computer.

* * * * *